Patented Sept. 11, 1945

2,384,493

UNITED STATES PATENT OFFICE 2,384,493

BRONZING LACQUER

Clifford Jay Rolle, Yonkers, N. Y., assignor to Interchemical Corporation, New York, N. Y., a corporation of Ohio No Drawing. Application October 10, 1940, Serial No. 360,608

3 Claims. (Cl. 117—46)

This invention relates to the coating of radio tube plates, and to compositions useful in their manufacture.

In the manufacture of plates for radio tubes, it is desirable to obtain a black surface which will withstand high temperatures and dissipate heat rapidly. This may be done at considerable expense by the deposition of a black metallic deposit on the formed plates. Attempts have been made to reduce cost by applying an organic coating containing black pigment to strip metal, drying the coating, forming the plates from the strip metal, and then heating the plates to about 900° C. in an atmosphere of hydrogen to char the coating. While fair results can be obtained by this method, using ordinary nitrocellulose lacquers, the base metal must be sandblasted before coating in order to get proper adherence of the charred coating after heating, so that the expense of the process is considerably increased.

I have discovered that successful adhesion to metal can be obtained in the process described above, together with a black film, by coating the metal before heating with a lacquer the solid content of which is essentially nitrocellulose, at least an equal quantity of camphor, and a small proportion of a "bronze" powder (a metallic powder, preferably aluminum).

The lacquer appears to have adhesion to the metal after charring because of the aluminum bronze carried by it. I believe the metal unites sufficiently with the base metal at 900° F. to give adhesion. However, the resultant color is grey, and the addition of black pigment to the lacquer spoils the adhesion. The greyness cannot be overcome by the char produced from ordinary nitrocellulose lacquers; and I have discovered that camphor, of the known nitrocellulose plasticizers, has the unique property of producing with nitrocellulose a charred film of sufficient blackness to cover the greyness of the aluminum powder, provided it is used in at least equal parts by weight with the nitrocellulose.

About enough bronze powder should be used to obtain coverage; this will depend on the particular bronze used. I prefer not to use over about ½ pound of bronze per gallon of lacquer, and have obtained best results with about ¼ pound of very good covering bronze.

The weight of nitrocellulose and camphor should be at least about 4 times the weight of bronze used in order to develop the proper blackness. I prefer to use as large an excess as possible, so that I prefer low viscosity (5 seconds or less) nitrocellulose.

The proportion of camphor to nitrocellulose may be varied from 1 to 1 up to the point where the lacquer is too soft to handle. Where the film is to be formed, an upper limit of 1½ to 1 is desirable.

A typical example of my invention is the following:

| | Parts by weight |
|---|---|
| ½ sec. R. S. nitrocellulose (30% alcohol) | 14.6 |
| Camphor | 13.7 |
| Solvent (5 volumes toluene, 2 ethyl acetate, 2 butyl acetate, 1 butanol) | 71.7 |

This lacquer contains 10.2 parts by weight dry nitrocellulose. It is used with ¼ pound per gallon of super-fine aluminum lining bronze, and applied to strip steel. The coating is dried, and the desired plates are then formed, and heated in hydrogen at 900° C. for five minutes. An adherent dull black deposit is formed.

Other plasticizers may be used in addition to the camphor, provided enough camphor is present to give the desired blackness of film.

Obviously, examples may be multiplied indefinitely without departing from the scope of my invention, which is defined in the claims.

I claim:
1. A lacquer comprising aluminum bronze powder in a vehicle consisting of a solution of nitrocellulose and camphor in volatile organic solvents, the camphor being present in at least as great quantity as the nitrocellulose, and not exceeding 1½ times the quantity, the nitrocellulose and camphor together equalling at least four times the weight of the bronze, the lacquer being characterized by the fact that it produces films on metal which can be carbonized by heating in hydrogen to 900° C., to produce black surfaces which will withstand high temperatures and dissipate heat rapidly.

2. The method of finishing which comprises applying to metal the lacquer of claim 1, drying the lacquer and heating the finished metal in hydrogen at about 900° C. to char the lacquer film and produce a metal carrying an adherent black deposit.

3. A lacquer comprising aluminum bronze powder in a vehicle consisting of a solution of nitrocellulose and camphor in volatile organic solvents, the camphor being present in at least as great quantity as the nitrocellulose, the nitrocellulose and camphor together equalling at least four times the weight of the bronze, the lacquer being characterized by the fact that it produces films on metal which can be carbonized by heating in hydrogen to 900° C., to produce black surfaces which will withstand high temperatures and dissipate heat rapidly.

CLIFFORD JAY ROLLE.